US012810179B2

(12) United States Patent
Sola et al.

(10) Patent No.: US 12,810,179 B2
(45) Date of Patent: Nov. 24, 2026

(54) SEMANTIC-AWARE RULE-BASED RECOMMENDATION FOR PROCESS MODELING

(71) Applicant: SAP SE, Walldorf (DE)

(72) Inventors: Diana Sola, Heidelberg (DE); Andreas Gerber, Koenigsbach (DE)

(73) Assignee: SAP SE, Walldorf (DE)

( * ) Notice: Subject to any disclaimer, the term of this patent is extended or adjusted under 35 U.S.C. 154(b) by 1298 days.

(21) Appl. No.: 17/688,528

(22) Filed: Mar. 7, 2022

(65) Prior Publication Data

US 2023/0281484 A1 Sep. 7, 2023

(51) Int. Cl.
*G06N 5/04* (2023.01)
*G06F 40/35* (2020.01)
*G06N 5/025* (2023.01)

(52) U.S. Cl.
CPC ............... *G06N 5/04* (2013.01); *G06F 40/35* (2020.01); *G06N 5/025* (2013.01)

(58) Field of Classification Search
CPC ........... G06N 5/04; G06N 5/025; G06F 40/35
See application file for complete search history.

(56) References Cited

U.S. PATENT DOCUMENTS

2014/0310053 A1* 10/2014 Liu .................... G06Q 10/0633 705/7.27
2022/0147842 A1* 5/2022 Gerber ................... G06N 5/022

FOREIGN PATENT DOCUMENTS

CN 113887941 A 1/2022
CN 14004505 A 2/2022

OTHER PUBLICATIONS

Sola, Diana, Christian Meilicke, Han van der Aa, and Heiner Stuckenschmidt. "A rule-based recommendation approach for business process modeling." In International Conference on Advanced Information Systems Engineering, pp. 328-343. Cham: Springer International Publishing, 2021. (Year: 2021).*
Makni, Lobna, Nahla Zaaboub Haddar, and Hanêne Ben-Abdallah. "Detection of Semantic Relations between Business Process Activity Labels." In ICEIS (3), pp. 273-277. 2012. (Year: 2012).*
Goldstein, Maayan, and Cecilia González-Álvarez. "Augmenting modelers with semantic autocompletion of processes." In International Conference on Business Process Management, pp. 20-36. Cham: Springer International Publishing, 2021. (Year: 2021).*
(Continued)

*Primary Examiner* — Casey R. Garner
(74) *Attorney, Agent, or Firm* — Buckley, Maschoff & Talwalkar LLC

(57) ABSTRACT

Computer-readable media, methods, and systems are disclosed for semantic-aware rule-based recommendation within a process modeling system in which one or more recommendations are determined based on application of one or more rules to a process model at run-time. The rules are generated from logical formulas based on certain relations within predefined process model selections, from which semantic relationships between activity labels within the process model increase the flexibility of the recommendations. Flexibility of the recommendations is further increased by applying rules such that they are fulfilled in a semantically similar sense rather than a strict sense.

20 Claims, 6 Drawing Sheets

(56) References Cited

OTHER PUBLICATIONS

Deng, Shuiguang, Dongjing Wang, Ying Li, Bin Cao, Jianwei Yin, Zhaohui Wu, and Mengchu Zhou. "A recommendation system to facilitate business process modeling." IEEE transactions on cybernetics 47, No. 6 (2016): 1380-1394. (Year: 2016).*

Wang, Huaqing, Lijie Wen, Li Lin, and Jianmin Wang. "RLRecommender: a representation-learning-based recommendation method for business process modeling." In International Conference on Service-Oriented Computing, pp. 478-486. Cham: Springer International Publishing, 2018. (Year: 2018).*

U.S. Appl. No. 17/092,139, entitled Business Process Modeling Recommendation Engine, filed Nov. 6, 2020, Gerber et al.

"Communication: The Extended European Search Report", European Patent Office, Jan. 27, 2023 (Jan. 27, 2023),for European Application No. 22188911.6-1203, 9pgs.

"Chinese First Office Action", dated Jun. 13, 2026 (Jun. 13, 2026), China National Intellectual Property Administration (CNIPA), for Chinese Application No. 2022211196251.2, 13pgs.

"English-language Translation, Chinese First Office Action", dated Jun. 13, 2026 (Jun. 13, 2026), China National Intellectual Property Administration (CNIPA), for Chinese Application No. 2022211196251.2, 18pgs.

* cited by examiner

400

402
hasLabel(n0,start)
hasLabel(n1,inquire about availability of products)
hasLabel(n2,inqury sent)
hasLabel(n3,quotation received)
...

404
followedBy(n0,n1)
followedBy(n1,n2)
followedBy(n2,n3)
followedBy(n3,n4)
...

406
inSameProcess(n0,n1)
inSameProcess(n0,n2)
inSameProcess(n0,n3)
inSameProcess(n0,n4)
...

FIG. 4

SEMANTIC-AWARE RULE-BASED RECOMMENDATION FOR PROCESS MODELING

BACKGROUND

Process modeling techniques including process modeling software are used to create process models which may be utilized to represent and communicate various processes such as functional operations and control schemes. However, process modeling is usually time-consuming and complex. An issue with current process modeling support techniques is that they are applied in a strict manner in which certain relationships based on natural language semantics are not considered.

SUMMARY

Embodiments solve the above-mentioned problems by providing systems, methods, and computer-readable media for semantic-aware rule-based recommendation within a process modeling system in which one or more recommendations are determined based on application of one or more rules to a process model at run-time. The rules are learned and applied while considering certain relationships, from which semantic relationships between activity labels within the process models increase the flexibility of the recommendations. In some embodiments, flexibility of the recommendations is further increased by applying rules such that they are fulfilled in a semantically similar sense rather than a strict sense.

In some aspects, the techniques described herein relate to one or more non-transitory computer-readable media storing computer executable instructions that, when executed by a processor, perform a method for semantic-aware rule-based recommendation within a process modeling system, the method including receiving a set of run-time process model selections from a user, each of the run-time process model selections including an activity label, determining one or more run-time relations between the run-time process model selections, wherein the one or more run-time relations includes a relation between natural language based semantic portions of the activity labels of the run-time process model selections, obtaining a set of run-time logical formulas based on the run-time process model selections and the one or more run-time relations, and determining one or more process model recommendations by applying a plurality of rules to the set of run-time logical formulas, wherein at least one rule of the plurality of rules is applied based on a semantic similarity of the activity labels of the run-time process model selections.

In some aspects, the techniques described herein relate to a computer-readable media, further including determining a recommendation confidence score for each of the one or more process model recommendations based on the applied rules of the plurality of rules, causing display of the recommendation confidence score to the user within a process modeling interface, and causing display of an explanation of a recommendation based on an explanation of at least one of the applied rules of the plurality of rules.

In some aspects, the techniques described herein relate to a computer-readable media, wherein the run-time process model selections further include a plurality of process model connections between process model components and at least one of the one or more run-time relations is determined based at least in part on the plurality of process model connections.

In some aspects, the techniques described herein relate to a method for semantic-aware rule-based recommendation within a process modeling system, the method including receiving a set of run-time process model selections from a user, each of the run-time process model selections including an activity label, determining one or more run-time relations between the run-time process model selections, wherein the one or more run-time relations includes a relation between natural language based semantic portions of the activity labels of the run-time process model selections, obtaining a set of run-time logical formulas based on the run-time process model selections and the one or more run-time relations, and determining one or more process model recommendations by applying a plurality of rules to the set of run-time logical formulas, wherein at least one rule of the plurality of rules is applied based on a semantic similarity of the activity labels of the run-time process model selections.

In some aspects, the techniques described herein relate to a method, further including retrieving a set of predefined process model selections from a process model repository, each predefined process model selection of the set of predefined process model selections including an activity label, and determining one or more relations between the predefined process model selections, wherein the one or more relations includes a relation between natural language based semantic portions of the activity labels of the predefined process model selections.

In some aspects, the techniques described herein relate to a method, further including obtaining a set of logical formulas by transforming each selection of the set of predefined process model selections into a respective logical formula that captures the respective activity label of each predefined process model selection and capturing the one or more relations between the predefined process model selections in logical formulas, and generating the plurality of rules based on the set of logical formulas, each rule of the plurality of rules including a confidence score, wherein each rule of the plurality of rules follows a predefined rule template of a set of predefined rule templates.

In some aspects, the techniques described herein relate to a method, further including identifying one or more rules of the plurality of rules corresponding to a process model recommendation of the one or more process model recommendations, and responsive to a user input from the user, removing the one or more rules from the plurality of rules.

In some aspects, the techniques described herein relate to a method, wherein the predefined process model selections from the process model repository further includes a plurality of process model connections between process model components and at least one of the one or more relations between the predefined process model selections is determined based at least in part on the plurality of process model connections.

In some aspects, the techniques described herein relate to a method, further including causing display of the one or more process model recommendations to the user within a process modeling interface associated with a process modeling application based on a respective confidence score of each applied rule.

In some aspects, the techniques described herein relate to a method, further including storing the plurality of rules in a rule data store associated with the process modeling application.

In some aspects, the techniques described herein relate to a method, further including training a machine learning algorithm associated with the process modeling application using a set of process modeling data from the process model repository, wherein the process model recommendations are based further on the application of the machine learning algorithm.

In some aspects, the techniques described herein relate to a method, wherein the one or more process model recommendations are displayed within a user-actuatable recommendation prompt configured to automatically provide an activity label to an unknown process model component based on a user selection.

In some aspects, the techniques described herein relate to a method, wherein the run-time logical formulas are obtained by transforming each selection of the set of run-time process model selections into a respective run-time logical formula that captures the respective activity label of each run-time process model selection and capturing the one or more run-time relations between the run-time process model selections in run-time logical formulas, In some aspects, the techniques described herein relate to a method, wherein at least one subsequent rule of the plurality of rules is applied strictly without considering semantic similarity of the activity labels.

In some aspects, the techniques described herein relate to a method, further including automatically adding an activity label associated with a selected process model recommendation of the one or more process model recommendations to a process model under development.

In some aspects, the techniques described herein relate to a method, wherein the run-time process model selections are received within a process model interface during run-time of a process model application.

In some aspects, the techniques described herein relate to a process modeling system including a process model repository, and a processor programmed to perform a method for semantic-aware rule-based recommendation within the process modeling system, the method including receiving a set of run-time process model selections from a user, each of the run-time process model selections including an activity label, determining one or more run-time relations between the run-time process model selections, wherein the one or more run-time relations includes a relation between natural language based semantic portions of the activity labels of the run-time process model selections, obtaining a set of run-time logical formulas based on the run-time process model selections and the one or more run-time relations, and determining one or more process model recommendations by applying a plurality of rules to the set of run-time logical formulas, wherein at least one rule of the plurality of rules is applied based on a semantic similarity of the activity labels of the run-time process model selections.

In some aspects, the techniques described herein relate to a process modeling system, further including a machine learning algorithm associated with a process modeling application, the machine learning algorithm trained using historic process model data from the process model repository.

In some aspects, the techniques described herein relate to a process modeling system, wherein the one or more relations within the set of logical formulas from the set of run-time process model selections includes a followed-by relation which defines an activity label which follows another activity label.

In some aspects, the techniques described herein relate to a process modeling system, wherein the one or more relations within the set of logical formulas from the set of run-time process model selections includes an in-same-process relation which defines an activity label which co-occurs with another activity label in a process model.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 4 depicts an exemplary set of logical formulas relating to some embodiments;

Figure 1:
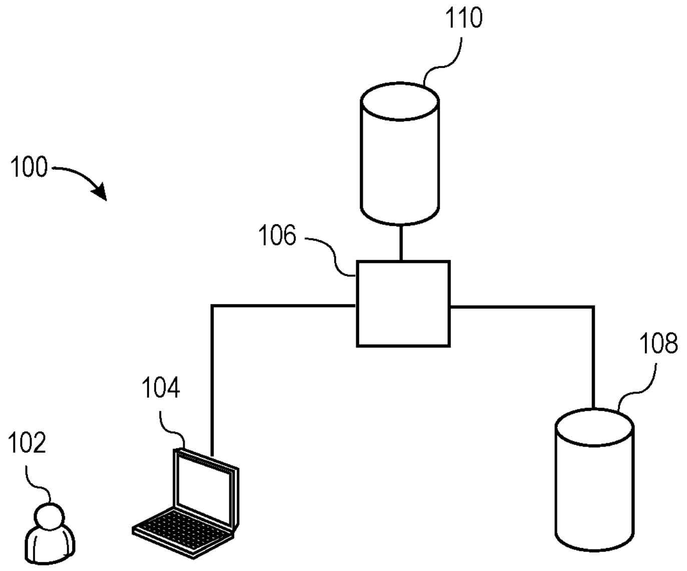
FIG. 1 depicts an exemplary system for providing process model recommendations relating to some embodiments.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary system 100 for providing process model recommendations is depicted relating to some embodiments. In some embodiments, the system

100 comprises a user 102 operating a user device 104, as shown. The user device 104 may be any suitable user computing device such as, for example, a laptop computer, desktop computer, mobile phone, tablet, or smart device. In some such embodiments, the user 102 may be using the user device 104 to develop a process model. Accordingly, user 102 may access a process modeling application 106 via the user device 104. In some embodiments, the process modeling application 106 may be executed on the user device 104. Alternatively, in some embodiments, the process modeling application 106 may be executed remotely on an external server and accessed via a web browser.

In some embodiments, the system 100 further comprises a process model repository 108, as shown, for storing process model information such as historical data relating to process models. In some such embodiments, the process modeling application 106 may retrieve information stored on the process model repository 108. In some embodiments, the process model repository 108 may be stored within a remote data store or external server. Alternatively, embodiments are contemplated in which the process model repository 108 is included within a storage of the user device 104.

In some embodiments, the user 102 may access the process modeling application 106 via the user device 104 to create a process model. Accordingly, embodiments are contemplated in which the process modeling application 106 provides recommendations based at least in part on user input from the user 102 and data retrieved from the process model repository 108, as will be described in further detail below.

In some embodiments, the system 100 further comprises a rule data store 110, as shown, associated with the process modeling application for storing rule data corresponding to a plurality of rules generated for process model recommendation, as will be described in further detail below. In some embodiments, the rule data store 110 may be communicatively coupled to the process modeling application 106. Alternatively, in some embodiments, a combined data store is contemplated in which a single data store stores both the process model data and the rule data. Further still, in some embodiments, a plurality of data stores is included storing portions of the rule data and the process model data. In some embodiments, any portion of the data stores may be included on a server, within the user device 104, or remotely within an external data store.

Figure 2:
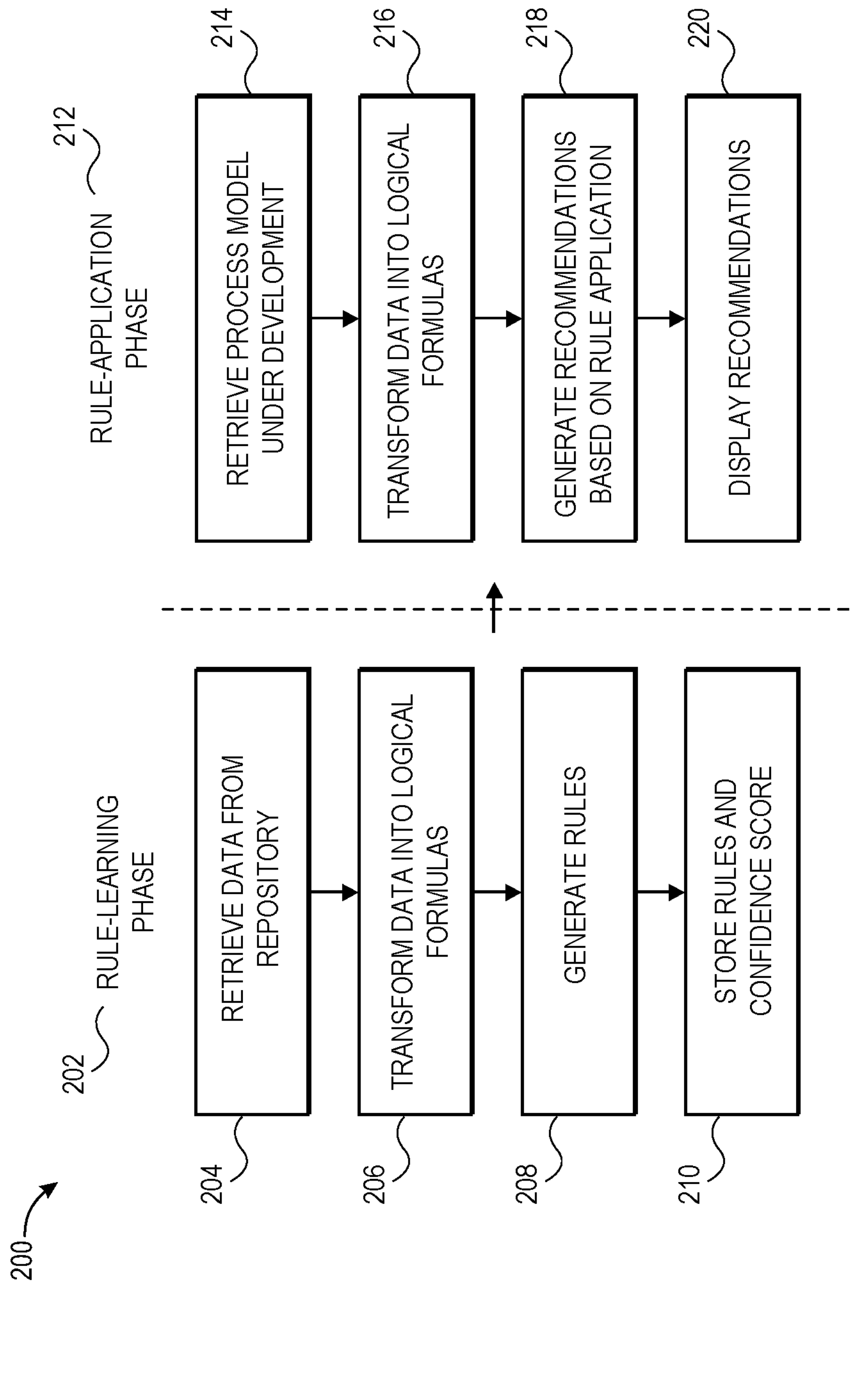
FIG. 2 depicts an exemplary flow diagram illustrating a rule-based recommendation process for supporting process modeling according to some embodiments.

Turning now to FIG. 2, an exemplary flow diagram 200 is depicted illustrating the rule-based recommendation process according to some embodiments. In some embodiments, a first phase of the rule-based recommendation process comprises a rule-learning phase 202, as shown. Here, one or more rules for providing recommendations for a process model are generated using the rule-learning phase 202. At step 204, a set of data is retrieved from the process model repository 108. In some embodiments, the set of data comprises one or more predefined process model selections. For example, the predefined process model selections may include historical process model configurations including a plurality of process model components with respective activity labels. At step 206, the set of data is transformed into logical formulas. These formulas are further discussed below with respect to FIGS. 3-4 below.

At step 208, one or more rules are generated based on the logical formulas and a set of predefined rule templates. In some embodiments, the rules are generated based at least in part on relations captured by the logical formulas which may be semantic or based on co-occurrence or positioning within a process model. In some embodiments, at least one rule may be generated based on a pattern associated with the process model data. For example, if it is determined that a specific activity label is typically followed by another subsequent activity label a rule may be generated to recommend the subsequent activity label when the specific activity label is recognized. Similarly, if it is determined that a specific activity label typically co-occurs with another activity label in a process model a rule may be generated to recommend this activity label when the specific activity label is recognized. In some embodiments, rules may consider verbs or action terms, as well as nouns and object terms within an activity label such that action patterns and object patterns may be identified within a process model. Here, for example, if an activity label "create request" is included in such an embodiment, the term "create" will be considered as the action term and the remaining non-action term "request" will be considered as the object term. If the exemplary activity label "create request" is followed by the activity label "analyze request" a rule may be learned that captures the action pattern that the activity label "create *" is typically followed by the activity label "analyze *", where * can be replaced by any specific object term. Similarly, if the exemplary activity label "create request" co-occurs with the activity label "create delivery" a rule may be learned that captures the object pattern that the activity label "* request" typically co-occurs with the activity label "* delivery", where * can be replaced by any specific action term. At step 210, the generated rules are stored along with an associated confidence score for each respective rule. In some embodiments, the confidence scores indicate a probability that a given rule makes a correct prediction.

In some embodiments, a second phase of the rule recommendation process comprises a rule-application phase 212, as shown. Here, the rules developed during the rule-learning phase 202 may be applied to generate recommendations during run-time of the process modeling application 106. At step 214, a set of data is retrieved relating to the process model under development. In some embodiments, the set of data comprises one or more process model selections received from a user, such as positioning and content of a plurality of process model components. At step 216, the received set of data is transformed into logical formulas.

At step 218, the one or more rules generated at step 208 are applied on the logical formulas to generate one or more process model recommendations. In some embodiments, the process model recommendations may be used to recommend a subsequent process model component which has not yet been added to the process model under development. In some embodiments, the rules may be applied to activity labels which are not identical but are semantically similar. For example, if a rule captures that the activity label "generate request" is followed by "analyze request", then it is likely that an activity label that is semantically similar to "generate request", e.g., "create request", is followed by "analyze request" as well, so this rule may be applied to semantically similar activity labels to recommend "analyze request" as a subsequent activity label. At step 220, the one or more process model recommendations are displayed or presented to the user. For example, in some embodiments, the process model recommendations may be displayed to the user 102 on user device 104.

Figure 3:
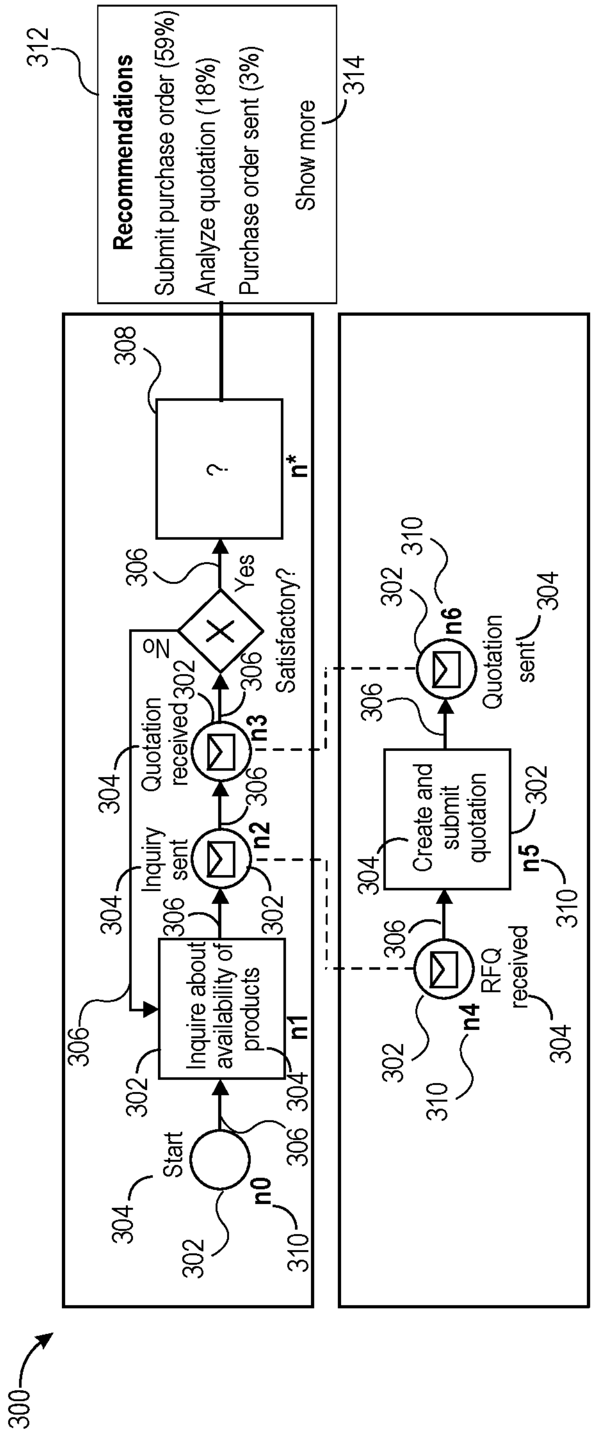
FIG. 3 depicts an exemplary process model relating to some embodiments.

Turning now to FIG. 3, an exemplary process model 300 is depicted relating to some embodiments. In some embodiments, the process model 300 is a process model which is currently under development. For example, the process model 300 may be generated for display on the user device 104 as part of a process model interface while the user 102 is utilizing the process modeling application 106. In the depicted example, the exemplary process model 300 is a business process model relating to generating and sending a sale quotation based on a customer inquiry. However, it should be understood that the process modeling application 106 may be used to generate many other different types of process models which do not relate to business processes or sales. For example, a process model may be generated to represent software development, infrastructure engineering, or virtually any type of functional process or set of operations.

In some embodiments, the process model 300 includes a plurality of process model components 302, as shown. In some such embodiments, each process model component 302 comprises an activity label 304. Alternatively, in some embodiments, only some of the process model components 302 comprise activity labels 304. In some embodiments, the activity label 304 defines an operation associated with the process model component. For example, the activity label may include a textual label such as "Start" or "Inquiry Sent". In some embodiments, each activity label 304 may be provided individually by the user 102 developing the process model 300, for example, by allowing the user 102 to type custom text to be used as the activity label 304. Alternatively, in some embodiments, the user 102 selects activity labels from a set of predefined activity labels each corresponding to a predefined set of text, or predefined verbs in combination with user-provided objects. Further, in some embodiments, a full activity label may be suggested including a set of predefined text comprising both an action term and object term. Further still, in some embodiments, user 102 may be able to further edit the predefined set of text such that the activity labels 304 comprise an arbitrary combination of predefined and custom text.

In some embodiments, the exemplary process model 300 further comprises one or more process model connections 306, as shown, for connecting two or more process model components 302. In some embodiments, the process model connections 306 may include arrows indicating a process direction between the process model components 302 such as to indicate a subsequent step. For example, a process model connection 306 may be included between a start process model component and an inquiry process model component with an arrow pointing towards the inquiry process model component, as shown, indicating that the inquiry process model component is performed after the start process model component. Additionally, in some embodiments, the process model connections 306 may indicate other variations of relationships between process model components 302. For example, branching arrows may indicate alternative outcomes for a given process model component.

In some embodiments, the process model 300 further comprises an unknown process model component 308 which has not yet been defined by the user 102. For example, the user may add the unknown process model component 308 to the process model 300 but not type or select an activity label 304 for the unknown process model component 308. Accordingly, in some embodiments, a question mark may be depicted within the unknown process model component 308 in place of an undefined activity label 304. Alternatively, in some embodiments, the unknown process model component 308 may be left blank until a recommendation is provided.

In some embodiments, the process model 300 further comprises a plurality of respective node labels 310 for each process model component 302. For example, the start process model component may correspond to a node label value of n0, as shown. Similarly, a node label value of n1 may correspond to a subsequent process model component, a node label value of n2 may correspond to yet another subsequent process model component, and so on. In some embodiments, the node value assignments may be stored within a node label data store or within the process model repository 108.

In some embodiments, a recommendation prompt 312 may be generated and displayed, as shown. In some such embodiments, the recommendation prompt 312 comprises one or more process model recommendations for the unknown process model component 308. Here, the process model recommendations may be ordered based on a confidence score determined for each respective recommendation. In some embodiments, the recommendation confidence scores may be displayed within the recommendation prompt 312, as shown. In some embodiments, the recommendations may be selected by the user 102 to autofill the unknown process model component 308 with the recommended activity label. Alternatively, embodiments are contemplated in which the recommended activity labels are automatically filled into the unknown process model component 308 without user intervention. Here, the user 102 may be able to review and further edit the auto filled activity label.

Further, in some embodiments, a "show more" actuator 314 may be included within the recommendation prompt 312 that, when actuated, provides additional information for the recommendations or displays more recommendations. Accordingly, in some embodiments, the recommendation prompt 312 may only include a predefined number of recommendations which have the highest recommendation confidence scores, such as the top three recommendations, as shown. However, the show more actuator 314 may be selected to show additional recommendations with lower recommendation confidence scores.

In some embodiments, an explanation may be displayed for each recommendation based on an explanation of at least one of the rules used to determine the recommendation. For example, an exemplary rule is applied which states if a "quotation received" activity label is included within a process model it is likely that a "submit purchase order" activity label will also be included. As such, the explanation for such an exemplary rule may state that the "submit purchase order" recommendation is provided because the "quotation received" activity label is included. In some embodiments, a variety of different explanations are provided for the recommendations.

Turning now to FIG. 4, an exemplary set of logical formulas 400 is depicted relating to some embodiments. Here, the exemplary set of logical formulas 400 may correspond to the exemplary process model 300 of FIG. 3. In some embodiments, the set of logical formulas 400 may comprise one or more node label definitions 402 which define a plurality of node assignments, as shown. In some embodiments, the node label definitions define a node number and a corresponding activity label for each node, as shown. Additionally, the set of logical formulas 400 may comprise one or more process model relations including followed-by relations 404 and in-same-process relations 406, as shown. In some embodiments, the followed-by relations 404 relate to a given node followed by another node. In some embodiments, the in-same-process relation 406 may correspond to any two nodes which both appear in the process model 300. In some embodiments, the followed-by relation defines an activity label which commonly follows another activity label. Further, in some embodiments, additional relations not explicitly described herein are also contemplated.

Figure 5:
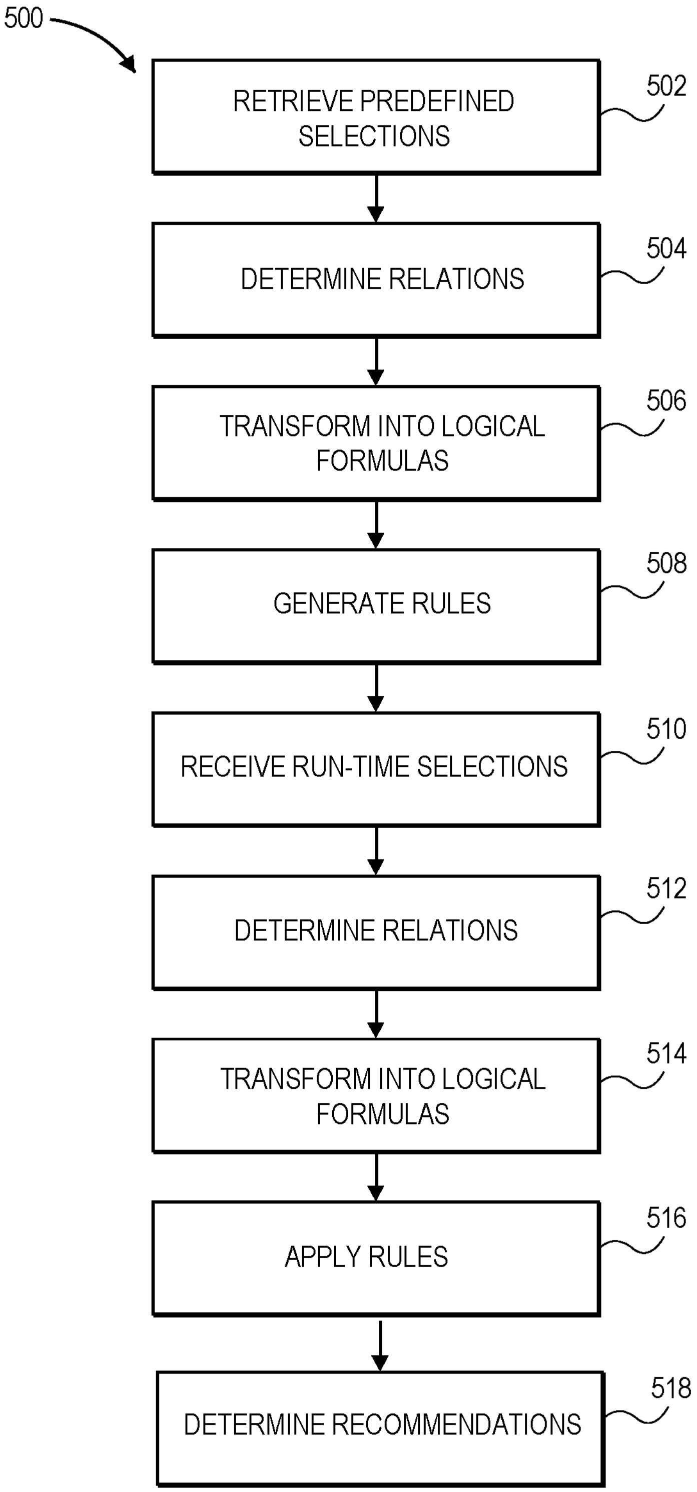
FIG. 5 depicts an exemplary method for providing process model recommendations relating to some embodiments.

Turning now to FIG. 5, an exemplary method 500 for providing process model recommendations is depicted relating to some embodiments. In some embodiments, at least a portion of the steps of method 500 may be executed on a processor, such as, for example, a processor of the user device 104 or a processor of a remote server. Further, embodiments are contemplated in which processing may be divided between two or more separate processors such that a first processor performs a first portion of steps and a second processor performs a second portion of steps.

At step 502 a set of predefined process model selections is retrieved. In some embodiments, the predefined process model selections may be retrieved from the process model repository 108. In some such embodiments, the predefined process model selections may comprise a plurality of process model selections of process model components with activity labels from a plurality of different process models. For example, in some embodiments, the predefined process model selections comprise selections from historical process model data of process models created over time. Further, in some embodiments, each process model selection of the set of process model selections comprises an activity label such as the activity labels 304, as shown in FIG. 3.

At step 504 one or more relations between the process model selections are determined. For example, the relations may be based on relationships between the retrieved process model selections such as determining that an activity label usually appears after another activity label in a process model. At step 506 the predefined process model selections are transformed into logical formulas. For example, the (labeled, directional) graph corresponding to the process model selection may be transformed into a corresponding set of first-order formulas suitable for techniques such as association rule mining or multi-relational modeling. In some embodiments, a logical formula may be determined for each selection of the set of predefined process model selections. In some embodiments, additional logical formulas may be generated based on relations between process model selections such as a followed by logical formula or an in same process logical formula. At step 508 a plurality of rules is generated based on the logical formulas of step 506. In some embodiments, the rules follow a set of predefined rule templates. In some embodiments, the rule templates may determine what types of rules are generated. In some such embodiments, a combination of rigid rule templates and semantic rule templates may be included within the set of predefined rule templates. For example, a rule may be generated to recommend said activity label which usually appears after another activity label if that activity label is added to a process model.

At step 510 a set of run-time process model selections is received from the user 102. In some embodiments, the run-time process model selections may be received from the user 102 through a process model interface displayed on a display of the user device 104 and associated with a process modeling application 106. At step 512 one or more run-time relations are determined for the run-time process model selections. This determination may also be performed similarly to the determination performed at step 504. At step 514 each of the run-time process model selections are transformed into respective logical formulas to obtain a set of run-time logical formulas. This transformation may be done, for example, in a similar way to the transformation performed at step 506.

At step 516 one or more of the plurality of rules generated from step 508 are applied to the run-time logical formulas based on the determined run-time relations. Here, the rules may be applied using any combination of contextual and semantic relationships between the run-time selections. In some embodiments, the rules may be applied while ignoring certain precise word matches. For example, the rules may consider words of the activity labels with a similar meaning to be the same. Accordingly, in some embodiments, one or more semantically similar activity labels may be interchangeable. For example, if the term "create" appears in an activity label that term is interchangeable with the term "generate" because the terms have a semantically similar meaning. As such, if a rule is applied which defines a certain activity label usually follows a "generate" activity label then the same activity label will be determined to follow a "create" activity label.

In some embodiments, certain rules may be applied in a strict sense such that they require identical activity labels, while other rules may be applied semantically such that they consider semantic similarity within the activity labels as in the "create", "generate" example described above. It should be understood that various additional semantic similarities and relationships are also contemplated. For example, in some embodiments, a semantic data store may be included which stores information indicative of a plurality of semantic relationships. Further, in some embodiments, one or more semantic templates may be provided which refer to an activity label and one or more equivalent activity labels having a similar meaning.

At step 518 one or more recommendations are determined based on the application of the rules. In some embodiments, the one or more recommendations may be displayed to the user to recommend an activity label for an unknown process model component. For example, the one or more recommendations may be displayed to the user 102 within the recommendation prompt 312, as shown in FIG. 3. In some embodiments, rules may make recommendations even if the bodies of the rules are not exactly true for a given process model. For example, the rules may be applied such that the activity labels do not have to exactly match the predefined activity labels used to generate the rules.

In some embodiments, step 508 may be repeated with respect to the run-time relations to generate additional rules. For example, the process model recommendation system may be trained with run-time data such that the recommendations become more accurate over time. In some embodiments, the plurality of rules may be updated based on a user input from the user. Additionally, in some embodiments, a machine learning algorithm may be associated with the process modeling application 106 which is trained using process model data from the process model repository. Accordingly, the machine learning algorithm may be retrained using the run-time data such that the machine learning algorithm improves over time.

In some embodiments, additional steps may be included, for example, to recommend a fragment or portion of an activity label. Here, the user may be able to select between a plurality of recommended process fragments to create a complex activity label. Further, in some embodiments, a complex activity label may be recommended which combines two or more process fragments. Further, in some embodiments, a step may be included for conformance checking or process optimization to improve the method 500. For example, the recommendations may be optimized over time by reviewing how often the user selects recommendations which were generated based on a given rule. In one example, if a rule generates a recommendation which is determined to never or rarely be selected, that rule may be removed or adjusted.

In some embodiments, rules may be updated, modified or removed during the rule application phase. For example, in some embodiments, if a user deems a recommendation to be incorrect, the user may provide a user input which causes one or more rules corresponding to the recommendation to updated or removed. In some embodiments, further steps may be provided for receiving said user input, identifying one or more rules corresponding to the recommendation, and removing the identified rules. In some embodiments, the organization of the rule recommendation system described herein provides a distinct advantage because the rules which correspond to each recommendation are easily available, as compared to systems which rely on black box recommendations such as neural networks or embedding-based approaches in which it may become difficult to identify specific rules and relations.

Figure 6:
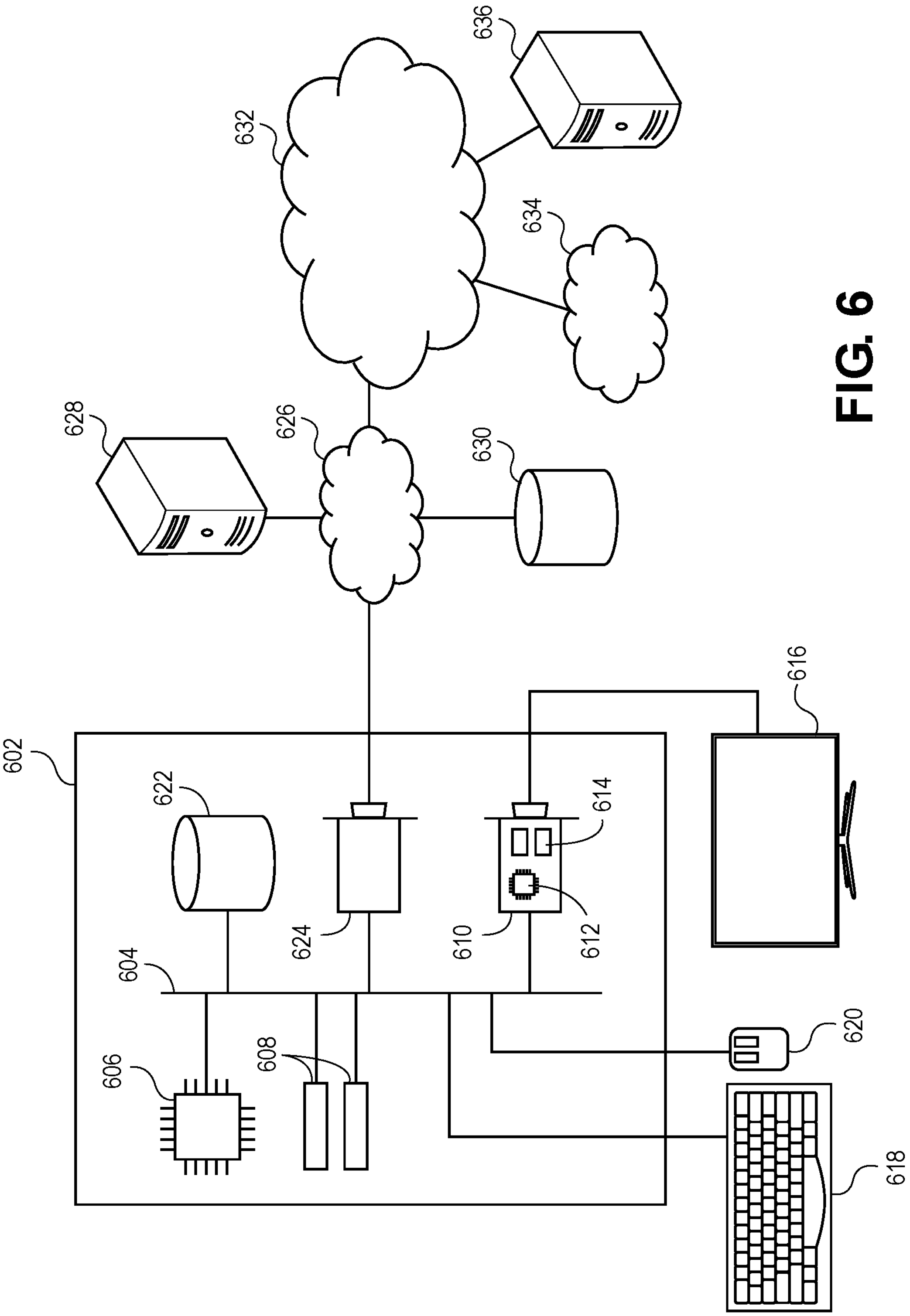
FIG. 6 depicts an exemplary hardware platform for certain embodiments.

Turning now to FIG. 6, an exemplary hardware platform for certain embodiments is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth®, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer executable instructions that, when executed by a processor, perform a method for providing one or more semantic-aware rule-based recommendations within a process modeling system, the method comprising performing, at run-time:

receiving a set of run-time process model selections from a user, each of the run-time process model selections comprising an activity label;

determining one or more run-time relations between the run-time process model selections by determining a semantic similarity of the activity labels based on a relation between natural language based semantic portions of the activity labels of the run-time process model selections;

modeling the set of run-time process model selections as a directional graph, based on the determined one or more run-time relations;

converting the directional graph into a set of run-time logical formulas; and determining one or more process model recommendations by applying a plurality of rules to the set of run-time logical formulas, wherein at least one rule of the plurality of rules is applied based on the semantic similarity of the activity labels of the run-time process model selections.

2. The computer-readable media of claim 1, further comprising:

determining a recommendation confidence score for each of the one or more process model recommendations based on the applied rules of the plurality of rules;

causing display of the recommendation confidence score to the user within a process modeling interface; and causing display of an explanation of a recommendation based on an explanation of at least one of the applied rules of the plurality of rules.

3. The computer-readable media of claim 1, wherein the run-time process model selections further comprise a plurality of process model connections between process model components and at least one of the one or more run-time relations is determined based at least in part on the plurality of process model connections.

4. A method for semantic-aware rule-based recommendation within a process modeling system, the method comprising:

receiving a set of run-time process model selections from a user, each of the run-time process model selections comprising an activity label;

determining one or more run-time relations between the run-time process model selections;

wherein the one or more run-time relations comprises a relation between natural language based semantic portions of the activity labels of the run-time process model selections;

obtaining a set of run-time logical formulas based on the run-time process model selections and the one or more run-time relations; and determining one or more process model recommendations by applying a plurality of rules to the set of run-time logical formulas, wherein at least one rule of the plurality of rules is applied based on a semantic similarity of the activity labels of the run-time process model selections.

5. The method of claim 4, further comprising:

retrieving a set of predefined process model selections from a process model repository, each predefined process model selection of the set of predefined process model selections comprising an activity label; and determining one or more relations between the predefined process model selections, wherein the one or more relations comprises a relation between natural language based semantic portions of the activity labels of the predefined process model selections.

6. The method of claim 5, further comprising:

obtaining a set of logical formulas by transforming each selection of the set of predefined process model selections into a respective logical formula that captures the respective activity label of each predefined process model selection and capturing the one or more relations between the predefined process model selections in logical formulas; and generating the plurality of rules based on the set of logical formulas, each rule of the plurality of rules comprising a confidence score, wherein each rule of the plurality of rules follows a predefined rule template of a set of predefined rule templates.

7. The method of claim 6, further comprising:

identifying one or more rules of the plurality of rules corresponding to a process model recommendation of the one or more process model recommendations; and responsive to a user input from the user, removing the one or more rules from the plurality of rules.

8. The method of claim 6, wherein the predefined process model selections from the process model repository further comprises a plurality of process model connections between process model components and at least one of the one or more relations between the predefined process model selections is determined based at least in part on the plurality of process model connections.

9. The method of claim 6, further comprising:

causing display of the one or more process model recommendations to the user within a process modeling interface associated with a process modeling application based on a respective confidence score of each applied rule.

10. The method of claim 9, further comprising:

storing the plurality of rules in a rule data store associated with the process modeling application.

11. The method of claim 9, further comprising:

training a machine learning algorithm associated with the process modeling application using a set of process modeling data from the process model repository, wherein the process model recommendations are based further on the application of the machine learning algorithm.

12. The method of claim 4, wherein the one or more process model recommendations are displayed within a user-actuatable recommendation prompt configured to automatically provide an activity label to an unknown process model component based on a user selection.

13. The method of claim 4, wherein the run-time logical formulas are obtained by transforming each selection of the set of run-time process model selections into a respective run-time logical formula that captures the respective activity label of each run-time process model selection and capturing the one or more run-time relations between the run-time process model selections in run-time logical formulas.

14. The method of claim 4, wherein at least one subsequent rule of the plurality of rules is applied strictly without considering semantic similarity of the activity labels.

15. The method of claim 4, further comprising:

automatically adding an activity label associated with a selected process model recommendation of the one or more process model recommendations to a process model under development.

16. The method of claim 4, wherein the run-time process model selections are received within a process model interface during run-time of a process model application.

17. A process modeling system comprising:

a process model repository; and a processor programmed to perform a method for providing one or more semantic-aware rule-based recommendations within the process modeling system, the method comprising performing, at run-time:

receiving a set of run-time process model selections from a user, each of the run-time process model selections comprising an activity label;

determining one or more run-time relations between the run-time process model selections;

determining one or more run-time relations between the run-time process model selections by determining a semantic similarity of the activity labels based on a relation between natural language based semantic portions of the activity labels of the run-time process model selections;

modeling the set of run-time process model selections as a directional graph, based on the determined one or more run-time relations;

converting the directional graph into a set of run-time logical formulas; and determining one or more process model recommendations by applying a plurality of rules to the set of run-time logical formulas, wherein at least one rule of the plurality of rules is applied based on the semantic similarity of the activity labels of the run-time process model selections.

18. The process modeling system of claim 17, further comprising:

a machine learning algorithm associated with a process modeling application, the machine learning algorithm trained using historic process model data from the process model repository.

19. The process modeling system of claim 17, wherein the one or more relations within the set of logical formulas from the set of run-time process model selections comprises a followed-by relation which defines an activity label which follows another activity label.

20. The process modeling system of claim 17, wherein the one or more relations within the set of logical formulas from the set of run-time process model selections comprises an in-same-process relation which defines an activity label which co-occurs with another activity label in a process model.

* * * * *